UNITED STATES PATENT OFFICE.

HUBER H. ROOT AND LLEWELLYN W. BOYDEN, OF MEDINA, OHIO.

FOOD AND CONFECTIONERY COMPOUND.

1,156,181.  Specification of Letters Patent.  Patented Oct. 12, 1915.

No Drawing.  Application filed April 21, 1913.  Serial No. 762,558.

*To all whom it may concern:*

Be it known that we, HUBER H. ROOT and LLEWELLYN W. BOYDEN, of Medina, in the county of Medina, and in the State of Ohio, have invented a certain new and useful Improvement in Food and Confectionery Compounds, and do hereby declare that the following is a full, clear, and exact description thereof.

Our invention relates to food products, and the object of our invention is to promote the use of honey which is preferable to other forms of sweets, such as cane sugar, because it is a predigested sweet, that is it is invert sugar, so that it can be assimilated much more readily than other forms of sweets.

Our invention, therefore, consists in the honey containing compound or product, substantially as hereinafter specified and claimed.

Our invention may be embodied in various compounds, or products. In one embodiment thereof we apply to a small bit or piece of comb honey a coating of chocolate, as by dipping the piece of comb honey into hot chocolate. This, while resulting in an attractive form of confectionery, has the important practical advantage that the coating of chocolate seals up, or closes the broken cells of the comb and thus prevents the dripping of honey from the broken cells. Instead of using comb honey, granulated honey may be employed that is covered with the chocolate and nuts and fruits may be added to this compound.

Another form of our invention is produced by a combination of ground peanuts and honey put together in such proportions, as to form a paste-like body, the honey in this case being in a liquid form to secure the right consistency.

Having thus described our invention what we claim is—

1. A food compound in the form of an article of manufacture, consisting of a piece of comb honey, and a coating of another element of food that closes the cells of the comb.

2. A food compound in the form of an article of manufacture, consisting of a piece of comb honey, and a chocolate coating that closes the cells of the comb.

In testimony that we claim the foregoing we have hereunto set our hands.

HUBER H. ROOT.
LLEWELLYN W. BOYDEN.

Witnesses:
FRANK SPELLMAN,
A. L. BOYDEN.